United States Patent [19]
Hagan et al.

[11] 3,800,406
[45] *Apr. 2, 1974

[54] TANTALUM CLAD NIOBIUM
[75] Inventors: Melvin A. Hagan, Palos Verdes Peninsula; Roy I. Batista, Palos Verdes Estates, both of Calif.
[73] Assignee: TRW Inc., Redondo Beach, Calif.
[ * ] Notice: The portion of the term of this patent subsequent to May 25, 1988, has been disclaimed.
[22] Filed: Dec. 20, 1971
[21] Appl. No.: 210,271

Related U.S. Application Data
[60] Division of Ser. No. 61,459, Aug. 5, 1970, Pat. No. 3,706,539, which is a continuation-in-part of Ser. No. 809,039, March 20, 1969, Pat. No. 3,579,808.

[52] U.S. Cl. .................................. 29/480, 29/527.4
[51] Int. Cl. ............................................. B23k 31/02
[58] Field of Search ........ 117/135.1; 29/198, 497.5, 29/504, 487, 194, 195, 475, 480, 527.4

[56] References Cited
UNITED STATES PATENTS
| | | | |
|---|---|---|---|
| 3,574,572 | 4/1971 | Friedrich et al. | 117/135.1 X |
| 3,579,808 | 5/1971 | Hagan et al. | 29/504 X |
| 3,654,332 | 4/1972 | Berger | 117/135.1 X |
| 3,692,558 | 9/1972 | Werner, Jr. | 117/135.1 X |

Primary Examiner—Richard B. Lazarus
Attorney, Agent, or Firm—Alan D. Akers; Willie Krawitz; Daniel T. Anderson

[57] ABSTRACT

A composite metal article is made by applying tantalum metal sheet to the surface of niobium metal and the two metals are diffusion bonded in a protective environment. The bonded metals may be cold worked to produce the final fabricated article. The final article is coated with an aluminide or a silicide coating.

4 Claims, No Drawings

TANTALUM CLAD NIOBIUM

This is a division, of application Ser. No. 61,459, filed Aug. 5, 1970, now U.S. Pat. No. 3,706,539, dated Dec. 19, 1972, which is a continuation-in-part of application Ser. No. 809,039, filed Mar. 20, 1969 now U.S. Pat. No. 3,579,808.

As technology advances it becomes more imperative to produce materials which can withstand higher temperatures. Many ceramics and cermets have been produced for a variety of applications in recent years to push the operating temperatures to ever higher levels. Aside from the major consideration of thermal stability of a material there also exists a problem of chemical stability in an oxidizing atmosphere. To be most useful, a material must not melt or distort at higher operating temperatures, and in addition, the material must not decompose. Thus, for example, many portions of aerospace vehicles, especially in their propulsion systems, may encounter temperatures well above the useful upper limit for common materials of construction. The refractory metals, however, possess useable strength properties to about 3,000°F and greater and have melting temperatures well above 4,000°F. Unfortunately, the practical utilization of refractory alloys is hindered by their inherent propensity to react with oxidizing gases to form brittle compounds unless protected by coatings.

It has now been discovered that by coating tantalum onto niobium a higher temperature resistant coating which more fully utilizes their inherent mechanical properties may be obtained. By diffusion bonding a thick tantalum sheet onto a niobium plate and reducing the composite by cold rolling, a protective coating may be produced which prevents the oxidation and embrittlement of niobium while increasing their upper use temperature limits for structural applications. Cladding of niobium with tantalum is a fairly massive form, with subsequent reduction by cold rolling, is feasible because of closely similar thermal expansion properties, excellent ductility, and similar working properties of fabricability. Tantalum has a higher modulus of elasticity and a higher tensile strength, which partially offsets its weight disadvantage of being nearly twice as dense as niobium. Perhaps the most important factor is that protective coatings permit higher use temperatures on tantalum than on niobium. Molten niobium oxide, which forms above about 2,700°F, exerts a strong fluxing action on protective coatings and can literally remove the coating as a droplet runs across the coated surface. This problem is considerably lessened with coating tantalum since tantalum oxide melts at a much higher temperature, approximately 3,400°F.

Protective coatings which are suitable for application and protection of the tantalum cladding are silicides and aluminides. Typical silicide protective coatings comprise, by weight, approximately 10 percent to approximately 30 percent chromium and approximately 50 percent to approximately 75 percent silicon with the balance comprising high temperature metals selected from the group consisting of titanium, iron, vanadium, molybdenum, tungsten, hafnium, tantalum, and aluminum. Aluminides are used less frequently for high temperature applications, however, they are formed similarly to the silicides. Typically, these coatings diffuse into the tantalum cladding approximately 1 to 2 mils and are built up on the surface 3 to 4 mils to give a total protective coating thickness of 4 to 6 mils.

In the process according to this invention, tantalum sheet is hot rolled or hot pressed bonded to niobium plate in an inert atmosphere retort or furnace. The bonded parts are then given a diffusion heat treatment at about 2,400° F in vacuum or inert atmosphere to develop a pore-free metallurgical bond. The plate thus formed can be cold rolled to obtain the desired sheet thickness. Parts formed from this sheet have the tantalum on the hot oxidizing atmosphere side, or if desired, both sides of the niobium can be clad with tantalum.

Upon fabrication of the final product, the protective coating is applied by vapor deposition or molten alloy deposition. Vapor deposition includes processes such as chemical vapor deposition, pack cementation, fluidized bed, sputtering, and similar techniques wherein the coating metal is transported to and deposited on the niobium or tantalum in the vapor state. Molten alloy deposition includes slurry and dip processes wherein the coating is applied on the niobium or tantalum while in the molten state.

The slurry application process is the most practical coating for complex structures. To apply the coating, metal powders are mixed in the desired ratio and suspended in an organic vehicle to form a slurry. The slurry is applied on the metal or alloy to be protected by spraying, dipping, or brushing. The slurry coated item is then heated to a molten state in an inert atmosphere thus permitting the coating to react with and diffuse into the surface to be protected, forming a higher melting protective complex.

The present invention will be better understood by reference to the following illustrative examples.

EXAMPLE I

A 1½ inch square tab of niobium (0.0622 inches thick) and a 1½ inch square tab of tantalum (0.0105 inches thick) were bonded by heating for two hours at 1,000 psi pressure and 2,000°F in an inert atmosphere. The resulting tab was then given a diffusion heat treatment in vacuum for 2 hours at 2400°F. The tab was cooled and then reduced by cold rolling from a thickness of about 0.072 inches to about 0.016 inches without difficulty.

The tab of bonded tantalum and niobium was coated by spraying with a slurry containing 20 grams of chromium, 5 grams of titanium, and 75 grams of silicon. It was then thermal cycled in an inert atmosphere to permit the coating to react and diffuse into the surface of the tab. After one hour at 2,500°F, the furnace was cooled and the silicide coated tab was removed.

EXAMPLE II

Six specimens were prepared using 1-foot square tantalum sheets (0.020 inches thick) and 1-foot square niobium plates (0.100 inches thick). The specimens were first cleaned and then placed in titanium retorts which were sealed by welding in a vacuum chanber. The retorts were heated to 2,200°F and then rolled to approximately 50 percent reduction in thickness. After cooling and removal from the retorts, the hot roll bonded sheets were given a vecuum diffusion heat treatment at 2,600°F for two hours. The sheets were then cold rolled whereby their thickness was reduced to as little as 0.010 inches without difficulty as indicated in the following table:

TABLE

| Specimen No. | AVERAGE THICKNESS | | |
|---|---|---|---|
| | SHEET | Nb | Ta |
| 1. | 0.0718 | 0.0604 (84.0%) | 0.0114 (16.0%) |
| 2. | 0.0367 | 0.0298 (81.5%) | 0.0069 (18.5%) |
| 3. | 0.0335 | 0.0276 (82.5%) | 0.0059 (17.5%) |
| 4. | 0.0208 | 0.0170 (81.5%) | 0.0038 (18.5) |
| 5. | 0.0196 | 0.0160 (81.5%) | 0.0036 (18.5%) |
| 6. | 0.0108 | 0.0089 (82.5%) | 0.0019 (17.5%) |

Next, a slurry was made using 20 grams of chromium, 10 grams of molybdenum, and 70 grams of silicon. The cold rolled tabs were sprayed with the slurry and then heated to 250°F for one hour in an inert atmosphere. A uniform coating of the silicide covered both sides of the tab. Metallographic examination of the cold rolled sheets showed uniform reduction in thickness of the niobium and tantalum.

Microhardness tests on samples showed that work hardening from cold rolling operations is easily eliminated by vecuum annealing, and the subsequent hardness values are again typical for annealed tantalum and niobium sheet. The interface diffusion zone showed microhardness values between those for tantalum sheet and niobium sheet.

The workability of the annealed tantalum clad niobium sheet was demonstrated by deep drawing a 1 inch diameter, 2 inch long closed end cylinder from a 0.032 inch thick, 3 inch diameter sheet (0.005 inch Ta, 0.027 inch Nb). Measurements of a section of the drawn cylinder showed very little reduction in thickness of the tantalum and niobium during the drawing operation with essentially no change in the thickness ratio.

This invention teaches the concept of cladding tantalum on niobium in a fairly massive state with subsequent reduction to sheet by cold rolling. Since coated tantalum can be exposed to several hundred degrees higher temperatures than coated niobium in oxidizing environments without catastrophic failure caused by the fluxing action of the molten oxide, it is conceivable that the maximum useful temperature limit for some structures can thus be significantly increased without suffering the weight penalty involved in substituting tantalum for niobium.

We claim:

1. A method of making a high temperature composite structure comprising:
   A. hot pressing a tantalum sheet onto a niobium alloy sheet,
   B. bonding said tantalum sheet to said niobium sheet by diffusion heat treatment in a protective environment,
   C. reducing the bonded sheet thickness by cold rolling, and
   D. applying a protective silicide coating on the tantalum cladding.

2. A method according to claim 1 wherein the protective silicide coating comprises by weight 10 percent to 30 percent chromium, 50 percent to 75 percent silicon and the balance selected from the group consisting of titanium, iron, vanadium, molybdenum, tungsten, hafnium, tantalum and aluminum.

3. A method according to claim 1 wherein the coating is applied by vapor deposition.

4. A method according to claim 1 wherein the coating is applied by molten alloy deposition.

* * * * *